(12) United States Patent
Tanahashi et al.

(10) Patent No.: US 8,956,112 B2
(45) Date of Patent: Feb. 17, 2015

(54) CMC TURBINE STATOR BLADE

(75) Inventors: Yosuke Tanahashi, Tokyo (JP); Akira Takahashi, Tokyo (JP); Hiroyuki Yagi, Tokyo (JP)

(73) Assignee: IHI Corporation, Tokyo (JP)

( * ) Notice: Subject to any disclaimer, the term of this patent is extended or adjusted under 35 U.S.C. 154(b) by 658 days.

(21) Appl. No.: 13/259,346

(22) PCT Filed: Mar. 24, 2010

(86) PCT No.: PCT/JP2010/055102
§ 371 (c)(1),
(2), (4) Date: Sep. 23, 2011

(87) PCT Pub. No.: WO2010/110325
PCT Pub. Date: Sep. 30, 2010

(65) Prior Publication Data
US 2012/0057985 A1   Mar. 8, 2012

(30) Foreign Application Priority Data

Mar. 26, 2009 (JP) ................................. 2009-075954

(51) Int. Cl.
*F01D 9/04* (2006.01)
*F01D 5/28* (2006.01)

(52) U.S. Cl.
CPC .............. *F01D 5/282* (2013.01); *F01D 5/284* (2013.01); *F01D 9/042* (2013.01); *Y02T 50/672* (2013.01)
USPC ..................... 415/200; 415/209.4; 415/210.1; 416/241 B

(58) Field of Classification Search
USPC ........ 415/134, 137, 139, 208.1, 208.2, 209.3, 415/209.4, 210, 200; 416/241 B
See application file for complete search history.

(56) References Cited

U.S. PATENT DOCUMENTS

| | | |
|---|---|---|
| 4,820,124 A | 4/1989 | Fried |
| 5,332,360 A | 7/1994 | Correia et al. |
| 6,648,597 B1 * | 11/2003 | Widrig et al. ................. 415/200 |
| 7,452,189 B2 | 11/2008 | Shi et al. |

(Continued)

FOREIGN PATENT DOCUMENTS

| | | |
|---|---|---|
| EP | 1 852 572 A2 | 11/2007 |
| JP | 7-150905 | 6/1995 |

(Continued)

OTHER PUBLICATIONS

International Search Report issued in corresponding application PCT/JP2010/055102, completed Jun. 7, 2010 and mailed Jun. 22, 2010.

(Continued)

*Primary Examiner* — Edward Look
*Assistant Examiner* — Juan G Flores
(74) *Attorney, Agent, or Firm* — Griffin & Szipl, P.C.

(57) ABSTRACT

A CMC turbine stator blade 1 includes a blade 2 which is formed of a ceramic matrix composite material, and a band 11 which is formed of a ceramic matrix composite material or a metallic material and supports the blade 2. The blade 2 includes a first fitting portion 5 to which the band 11 is fitted at the outside thereof. The band 11 includes a second fitting portion 12 to which the first fitting portion 5 is fitted at the inside thereof. The CMC turbine stator blade 1 includes fixing means 6 which sandwiches the second fitting portion 12 from both sides in the height direction of the blade so that the blade 1 and the band 11 are fixed.

6 Claims, 5 Drawing Sheets

(56) References Cited

U.S. PATENT DOCUMENTS

| | | | |
|---|---|---|---|
| 8,257,038 B2 * | 9/2012 | James | 415/215.1 |
| 2004/0096323 A1 * | 5/2004 | Hagle et al. | 415/210.1 |
| 2007/0258811 A1 | 11/2007 | Shi et al. | |

FOREIGN PATENT DOCUMENTS

| | | |
|---|---|---|
| JP | 10-205305 A | 8/1998 |
| JP | 2007-255224 | 10/2007 |
| JP | 2007-298024 A | 11/2007 |

OTHER PUBLICATIONS

International Search Report issued in related application PCT/JP2010/055104, completed Jun. 7, 2010 and mailed Jun. 22, 2010.

Office Action issued in corresponding Canadian application 2,752,426 on Apr. 3, 2013.

Office Action issued in co-pending U.S. Appl. No. 13/259,263 on Apr. 24, 2014.

* cited by examiner

CMC TURBINE STATOR BLADE

This is a National Phase Application in the United States of International Patent Application No. PCT/JP2010/055102 filed Mar. 24, 2010, which claims priority on Japanese Patent Application No. 2009-075954, filed Mar. 26, 2009. The entire disclosures of the above patent applications are hereby incorporated by reference.

TECHNICAL FIELD

The present invention relates to a turbine blade that is formed of a ceramic matrix composite material (CMC), and particularly, to a CMC turbine stator blade in which a blade and a band are fastened (bonded) to each other with a simple structure.

BACKGROUND ART

A turbine stator blade is a component that is provided in a flow path of a combustion gas from a combustor in a gas turbine engine. FIG. 1 illustrates an example of an existing turbine blade 30. The turbine blade 30 includes a plurality of blades 31 which are disposed about the axis of the turbine at intervals in the circumferential direction, and bands 32 which support both ends of each blade 31 and extend in the circumferential direction.

Since the surface of the turbine stator blade 30 is exposed to a hot combustion gas (mainstream gas) 34 discharged from a combustor, the surface of the turbine blade needs to be prevented from being damaged by the heat. For this reason, the inside of the blade is cooled by cooling air, and film cooling is performed to cool the surfaces of the blade and the band such that cooling air is blown out from cooling holes provided in the blade and the band to form a layer of the cooling air. Since the turbine stator blade has a complex structure to perform such film cooling, manufacturing costs become high. Further, since a part of high-pressure air contributing to the thrust force is used as cooling air, there is a loss in the thrust force.

On the other hand, in an airplane engine, since the output and efficiency of the turbine may improve by increasing the temperature of a combustion gas, an increase in the temperature of the combustion gas is important for high performance of the airplane engine. Further, there is a need to decrease the weight of the components for high performance of the airplane engine. For this reason, a study has been conducted which attempts to use a ceramic matrix composite material (CMC: Ceramic Matrix Composites) as a material for forming the turbine stator blade, where the CMC has a benefit in that the heat resistance is superior to that of the metallic material and the specific gravity is smaller than that of the metallic material.

The CMC is a composite material of fiber fabric and ceramic, and in order to maintain the strength, the fiber fabric needs to be disposed in the smaller parts of components. The blade with the film cooling structure has a complex structure. Further, in the blade and the band, the constitution direction of the fiber fabric are different in accordance with the requirements of function and strength. For this reason, it is difficult to integrally form the portions of the blade and the band from the fiber fabric using the current technique. For this reason, a technique is adopted which separately manufactures the blade and the band and fastens both to each other to form a turbine stator blade.

However, since the strength of the CMC is smaller than that of metal, there is a need to prepare a countermeasure for alleviating a concentration of stress in the bonded portion when the components formed of CMC are bonded to each other. Further, when a gap is formed in the fastened portion, the mainstream gas may leak from the gap. For this reason, there is a need to prepare a countermeasure for reducing the leakage.

Incidentally, Patent Document 1 below discloses a background art in which a blade and a band are separately manufactured and both are fastened to each other to form a turbine blade.

FIGS. 2A and 2B are cross-sectional views illustrating a turbine blade 40 disclosed in Patent Document 1. In FIGS. 2A and 2B, a blade 41 and a band (a platform) 42 are separately manufactured components, and both are bonded to each other to form the turbine blade 40. In FIG. 2A, the blade 41 and the band 42 are fastened to each other by mechanical fastening means (a bolt, a clamp, a pin, or the like) 43 penetrating both. In FIG. 2B, the blade 41 and the band 42 are fastened to each other by a reinforcement member 44 with a U-shaped cross-section.

PRIOR ART DOCUMENT

Patent Document

[Patent Document 1] U.S. Pat. No. 6,648,597

SUMMARY OF THE INVENTION

Problems to be Solved by the Invention

However, in the fastening structure shown in FIG. 2A, since both the blade 41 and the band 42 are fastened to each other by the mechanical fastening means 43 penetrating both, the mechanical fastening means 43 needs to be attached to a plurality of positions in order to properly fix both, and the fastening work becomes difficult when the blade 41 is small in size. As a result, there is a problem in that the assembling workability is poor.

Further, even in the fastening structure shown in FIG. 2B, the reinforcement member 44 needs to be attached to a plurality of positions in order to properly fix the blade and the band. As a result, there is a problem in that the assembling workability is poor. Further, there is a problem in that a stress concentrates on a portion on which the mechanical fastening means has been attached.

The present invention is made in view of the above-described problems, and it is an object of the present invention to provide a CMC turbine stator blade capable of reducing a concentration of stress in a bonded portion between the blade and the band, reducing a leakage of a gas between the blade and the band, and simply fastening the blade and the band to each other during assembly.

Means for Solving the Problems

In order to solve the above-described problems, the CMC turbine stator blade of the present invention adopts the following technical means.

According to the present invention, there is provided a CMC turbine stator blade comprising: a blade which is formed of a ceramic matrix composite material; and a band which is formed of a ceramic matrix composite material or a metallic material and supports the blade, wherein the blade and the band are bonded to each other, the blade includes a first fitting portion to which the band is fitted at an outside thereof, the band includes a second fitting portion to which the first fitting portion is fitted at an inside thereof, and the CMC turbine stator blade further comprises fixing means which sandwiches the second fitting portion from both sides in a height direction of the blade so that the blade and the band are fixed.

According to the configuration of the present invention, the fixing means sandwiches the second fitting portion from both sides of the blade in the height direction so that the blade and the band can be fixed to each other. For this reason, the blade and the band are not physically integrated with each other, but only the relative movement thereof is restrained by the fixing means. Thereby, a concentration of stress at the fastened portion between the blade and the band may be reduced. Further, since a structure is formed which sandwiches the second fitting portion from both sides of the blade, such a structure also has a gas sealing function.

Further, in the CMC turbine stator blade, the blade includes a blade body which is exposed to a combustion gas, and a blade-tip forming-portion which extends from an end portion of the blade body in the height direction of the blade and which includes the first fitting portion, a step is formed at a boundary between the blade body and the blade-tip forming-portion to support the second fitting portion, a fixing groove is formed in the blade-tip forming-portion to extend along the periphery thereof, and the fixing means includes the step, the fixing groove, and a retainer which is fitted to the fixing groove and extends along the fixing groove such that the second fitting portion is sandwiched between the retainer and the step.

According to the above-described configuration, since the fixing groove is formed in the blade-tip forming-portion to extend along the periphery thereof, and the retainer is fitted to the fixing groove, the gas sealing performance may improve by fitting the retainer to the fixing groove.

Further, since the blade and the band are fixed by fitting the retainer to the fixing groove during assembly, both may be fastened to each other with a simple work even when the blade is small in size.

Further, in the CMC turbine stator blade, the retainer is a single component which has a length encircling the blade-tip forming-portion and has a cutout portion at a part thereof.

According to the above-described configuration, the retainer may be fitted to the fixing groove in a manner of being elastically deformed. Since the retainer is a single component, the number of components of the fixing means may be small, and the assembly work may be simply performed.

Further, in the CMC turbine stator blade, the retainer has both ends at the cutout portion that are bonded to each other.

According to the above-described configuration, since both ends of the retainer are bonded to each other, the separation of the retainer may be prevented after the retainer are fitted to the fixing groove.

Further, in the CMC turbine stator blade, the retainer has a plurality of components that extends in a circumferential direction of the blade-tip forming-portion and that are connected to each other to encircle the blade-tip forming-portion.

As in the above-described configuration, the retainer may include a plurality of components, and the retainer may be attached for assembly such that the plurality of components constituting the retainer are fitted to the fixing groove and the components are connected to each other by means such as adhering.

Further, in the CMC turbine stator blade, the retainer and the blade-tip forming-portion or the retainer and the band are adhered to each other.

According to the above-described configuration, since adhering is also performed, it is possible to reinforce the fixing of the blade and the band.

Advantage of the Invention

According to the CMC turbine stator blade of the present invention, it is possible to reduce a concentration of stress in the bonded portion between the blade and the band, reduce the leakage of a gas between the blade and the band, and simply fasten the blade and the band to each other during assembly.

EMBODIMENTS OF THE INVENTION

Figure 1:
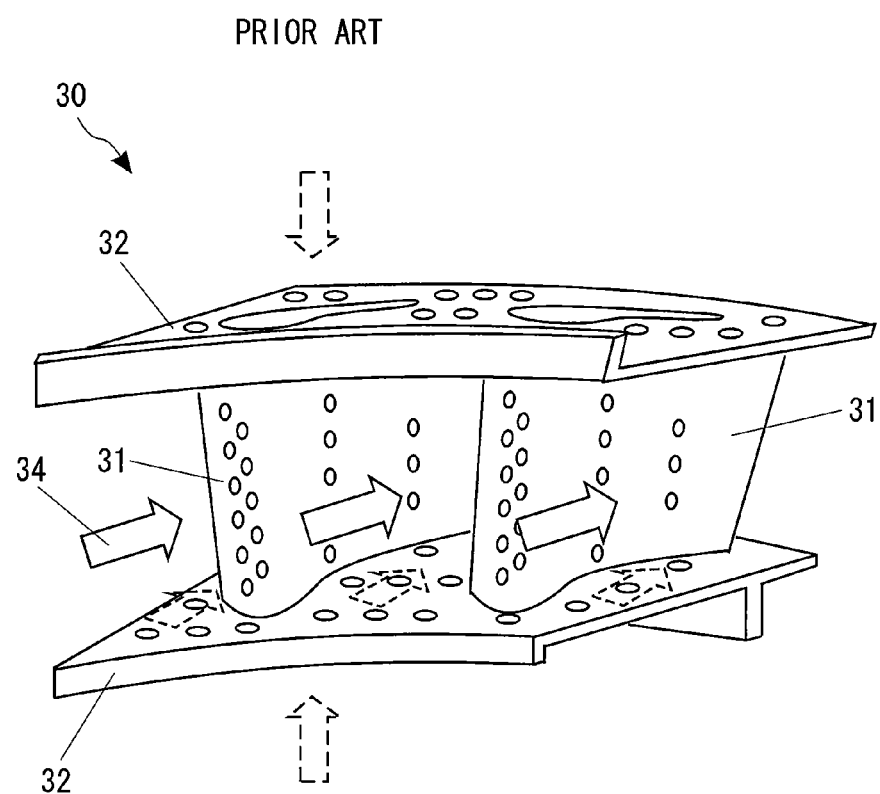
FIG. 1 is a diagram illustrating an example of an existing turbine stator blade.
Figure 2A:
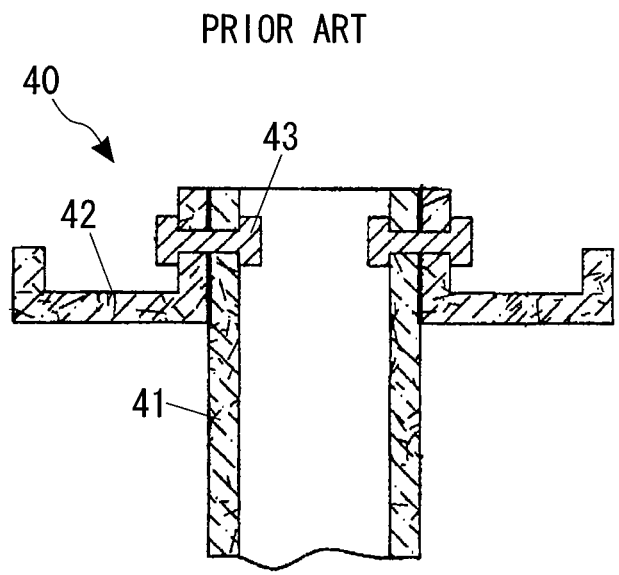
FIG. 2A is a diagram illustrating the structure of a turbine blade disclosed in Patent Document 1.
Figure 2B:
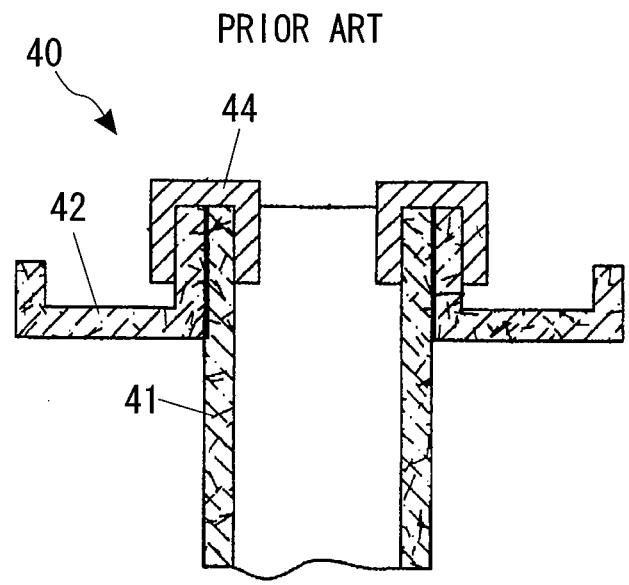
FIG. 2B is a diagram illustrating another structure of the turbine blade disclosed in Patent Document 1.

Hereinafter, exemplary embodiments of the present invention will be described by referring to the accompanying drawings. Furthermore, the same reference numerals will be given to the same or common components of the drawings, and the repetitive description will be omitted.

Figure 3:
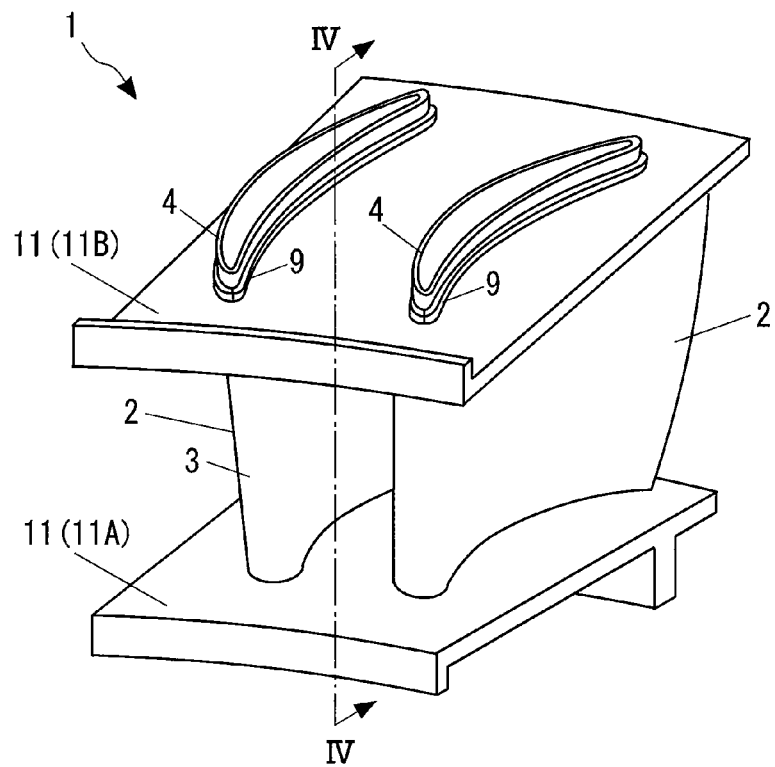
FIG. 3 is a schematic perspective view illustrating a first embodiment of a turbine stator blade according to the present invention.

FIG. 3 is a diagram illustrating a first embodiment of a turbine stator blade 1 according to the present invention, and is a schematic perspective view when the turbine stator blade 1 is seen from the upstream side of the flow direction of the mainstream gas.

In the description below, the "radial direction" indicates the radial direction of the turbine.

In FIG. 3, the CMC turbine stator blade 1 includes a plurality of blades 2 which are disposed at intervals in the circumferential direction about the axis of the turbine, and bands 11 which support both sides of each blade 2 and extend in the circumferential direction. In the specification, the band 11 located at the inner side (the lower side of FIG. 3) of the radial direction is defined as a first band 11A, and the band 11 located at the outer side (the upper side of FIG. 3) of the radial direction is defined as a second band 11B. However, hereinafter, both the first band 11A and the second band 11B are generally referred to as the band 11 except for cases where they need to be separately referred to for description.

The blade 2 is formed of a ceramic matrix composite material (CMC), the band 11 is formed of a CMC or a metallic material, both are separately manufactured components, and the turbine stator blade 1 is formed by fastening (bonding) both to each other. In the CMC process of manufacturing the blade 2 and the band 11, known techniques such as PIP (polymer immersion pyrolysis) or CVI (chemical vapor infiltration) may be used. The reinforcement fiber in the CMC may be a ceramic material, and for example, silicon carbide may be used as the reinforcement fiber.

The CMC turbine stator blade 1 shown in FIG. 3 forms one segment by disposing two blades 2 between the first band 11A and the second band 11B, and in the stator blade unit of the gas turbine, these segments are arranged over 360° about the axis of the turbine. However, the present invention is not limited to the configuration of FIG. 3, and a configuration may be adopted in which one or three or more blades 2 are disposed in one segment.

Since the surface of the CMC turbine stator blade 1 is exposed to a hot combustion gas (mainstream gas) discharged from a combustor, the surface of the turbine blade needs to be prevented from being damaged by the heat. For this reason, the inside of the blade 2 is cooled by cooling air, and film cooling is performed to cool the surfaces of the blade 2 and the band 11 such that cooling air is blown from cooling holes provided in the blade 2 and the band 11 to form a layer of the cooling air. Thereby, the surfaces of the blade 2 and the band 11 are cooled. The cooling hole for film cooling is not shown in FIG. 3 for simplicity of the drawing.

Figure 4:
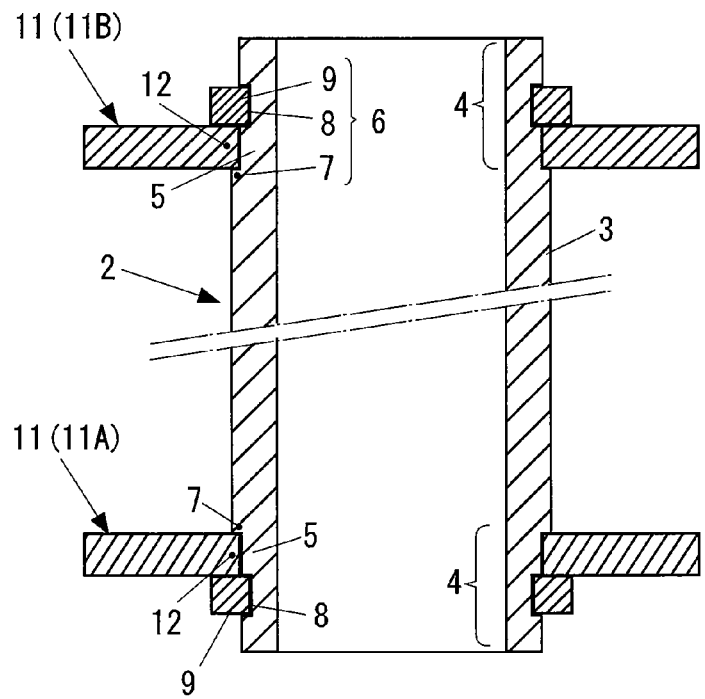
FIG. 4 is a cross-sectional view taken along the line IV-IV of FIG. 3.
Figure 5:
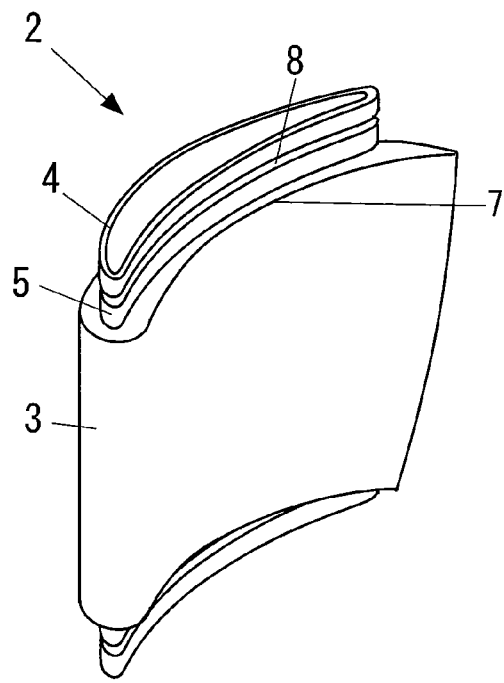
FIG. 5 is a perspective view illustrating a configuration example of a blade of a turbine stator blade according to the present invention.

FIG. 4 is a cross-sectional view taken along the line IV-IV of FIG. 3. FIG. 5 is a perspective view only illustrating the blade 2.

As shown in FIGS. 4 and 5, the blade 2 includes a first fitting portion 5 to which the band 11 is fitted at the outside thereof, and the band 11 includes a second fitting portion 12 to which the first fitting portion 5 is fitted at the inside thereof. Then, in the blade 2 and the band 11 with such a configuration, the outer periphery of the first fitting portion 5 is fitted to the inner periphery of the second fitting portion 12, so that the blade 2 and the band 11 are fitted to each other.

The turbine stator blade 1 of the present invention includes fixing means 6 which sandwiches the second fitting portion 12 from both sides in the height direction of the blade so that the blade 2 and the band 11 are fixed.

As shown in FIGS. 4 and 5, the blade 2 includes a blade body 3 which is exposed to a combustion gas, and a blade-tip forming-portion 4 which extends from the end portion of the blade body 3 in the height direction of the blade and which has the first fitting portion 5 formed at a part thereof. Specifically, the blade-tip forming-portion 4 including the first fitting portion 5 fitted to the second fitting portion 12 at the inner side (the lower side of FIG. 4) of the radial direction extends toward the inner side of the radial direction from the lower end of the blade body 3. The blade-tip forming-portion 4 including the first fitting portion 5 fitted to the second fitting portion 12 at the outer side (the upper side of FIG. 4) of the radial direction extends toward the outer side of the radial direction from the upper end of the blade body 3.

A step 7 is formed at the boundary between the blade body 3 and the blade-tip forming-portion 4 to support the second fitting portion 12. A fixing groove 8 is formed in the blade-tip forming-portion 4 to extend along the periphery thereof. The fixing groove 8 is formed to encircle the blade-tip forming-portion 4.

The step 7 and the fixing groove 8 may be formed in the blade-tip forming-portion 4 by, for example, machining, but the step 7 and the fixing groove 8 may be formed without machining by preparing the fiber fabric to have a shape of the step 7 and the fixing groove 8.

As shown in FIG. 4, the fixing means 6 includes the step 7, the fixing groove 8, and a retainer 9. The retainer 9 is a component which is fitted to the fixing groove 8, extends along the fixing groove 8, and sandwiches the second fitting portion 12 between the step 7 and the retainer 9.

The retainer 9 may be formed of, for example, metal. The retainer 9 may be formed of a refractory metal such as INCONEL (trademark), WASPALOY (trademark), or UDIMET (trademark). Further, the retainer 9 may be formed of CMC.

Figure 6A:
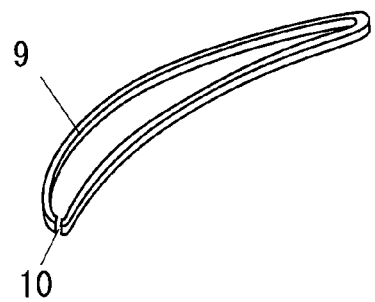
FIG. 6A is a perspective view illustrating a first configuration example of a retainer of the turbine stator blade according to the present invention.

FIG. 6A is a perspective view illustrating a first configuration example of the retainer 9. As shown in FIG. 6A, the retainer 9 of the first example is a single component which has a length encircling the blade-tip forming-portion 4 and has a cutout portion 10 formed at a part thereof. During assembly, the retainer 9 may be fitted into the fixing groove 8 in a manner of being elastically deformed to be widened. Here, although the retainer 9 of the first example is shown in FIG. 3, it is desirable that both ends located at the cutout portion 10 in FIG. 6A be bonded to each other by means such as adhering.

Figure 6B:
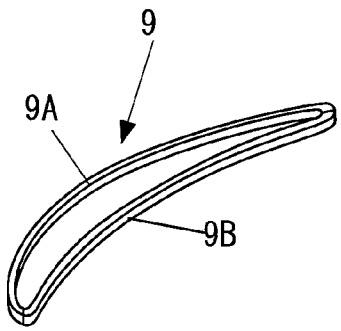
FIG. 6B is a perspective view illustrating a second configuration example of a retainer of the turbine stator blade according to the present invention.

FIG. 6B is a diagram illustrating a second configuration example of the retainer 9. As shown in FIG. 6B, the retainer 9 of the second example includes a plurality of (two in the drawing) components 9A and 9B which extend in the circumferential direction of the blade-tip forming-portion 4. During assembly, the retainer 9 may be attached such that the components 9A and 9B constituting the retainer 9 are fitted into the fixing groove 8, and the components 9A and 9B are connected to each other by means such as adhering. Furthermore, the number of components (the number of segments) constituting the retainer 9 may be three or more.

Next, the sequence of assembling the CMC turbine stator blade 1 with the above-described configuration will be described by referring to FIGS. 3 and 4.

First, the blade 2, the first band 11A, and the second band 11B formed of CMC are prepared. The first fitting portion 5 is fitted into the second fitting portion 12 of the first band 11A up to a position where the step 7 of the blade 2 and the second fitting portion 12 contact each other. The first fitting portion 5 is fitted into the second fitting portion 12 of the second band 11B up to a position where the step 7 of the blade 2 and the second fitting portion 12 contact each other.

Subsequently, the retainer 9 is fitted into the fixing groove 8 at each of the inner side (the lower side of FIG. 4) of the radial direction and the outer side (the upper side of FIG. 4) of the radial direction. Accordingly, the second fitting portion 12 is sandwiched between the step 7 and the retainer 9, so that the blade 2 and the band 11 are fixed.

According to the first embodiment of the present invention, the fixing means 6 sandwiches the second fitting portion 12 from both sides of the blade 2 in the height direction so that the blade 2 and the band 11 can be fixed. For this reason, the blade 2 and the band 11 are not physically integrated with each other, but only the relative movement thereof is restrained by the fixing means 6. Thereby, a concentration of stress at the fastened portion between the blade 2 and the band 11 may be reduced. Further, since a structure is formed which sandwiches the second fitting portion 12 from both sides of the blade, such a structure also has a gas sealing functions.

Further, according to the first embodiment, since the fixing groove 8 is formed in the blade-tip forming-portion 4 to extend along the periphery thereof, and the retainer 9 is fitted into the fixing groove 8, the gas sealing performance may improve by fitting the retainer 9 into the fixing groove 8.

Further, since the blade 2 and the band 11 are fixed by fitting the retainer 9 into the fixing groove 8 during assembly, both may be fastened to each other with a simple work even when the blade 2 is small in size.

Further, when the retainer 9 of the first configuration example shown in FIG. 6A is used, the retainer 9 may be simply fitted into the fixing groove 8 in a manner of being elastically deformed. Since the retainer 9 is a single component, the number of components of the fixing means 6 may be small, and the assembly work may be simply performed. Further, when the retainer 9 of the first configuration example is used, if both ends of the retainer 9 are bonded to each other as shown in FIG. 3, the separation of the retainer 9 may be prevented after the retainer 9 is fitted into the fixing groove 8.

Further, when the retainer 9 of the second configuration example shown in FIG. 6B is used, the retainer 9 may be attached such that the plurality of components 9A and 9B constituting the retainer 9 are fitted into the fixing groove 8, and the components 9A and 9B are connected to each other by means such as adhering. Unlike the case where the retainer 9 of the first configuration example needs to be fitted into the fixing groove 8 in a manner of being elastically deformed to be widened, the separation-type retainer 9 as in the second configuration does not need to be elastically deformed, and may be formed of CMC.

Figure 7:
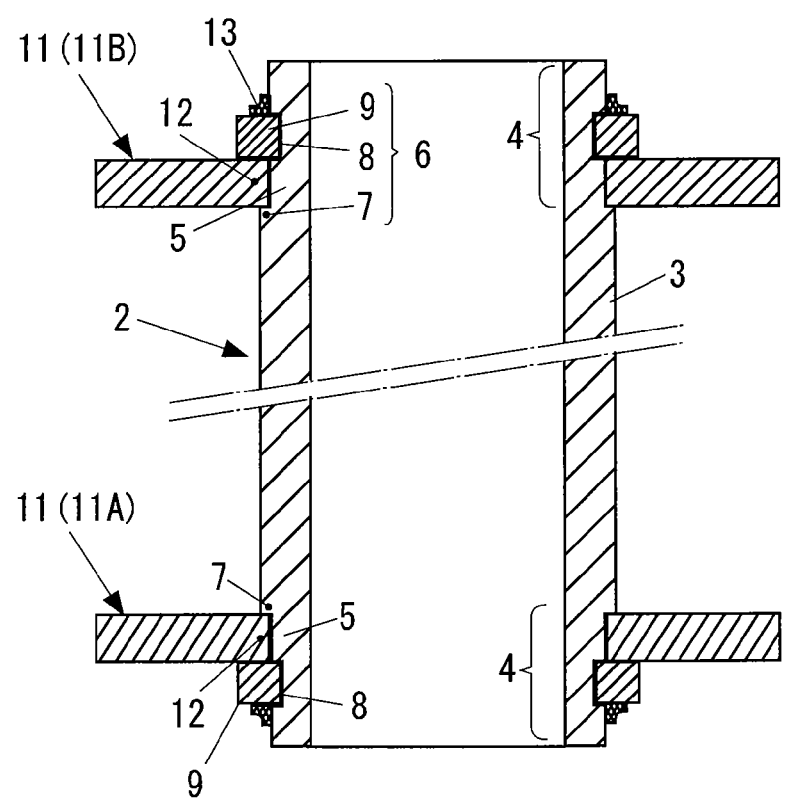
FIG. 7 is a cross-sectional view illustrating a second embodiment of the turbine stator blade according to the present invention.

FIG. 7 is a diagram illustrating a second embodiment of the turbine stator blade 1 of the present invention, and is a cross-sectional view which is the same as that of FIG. 4. In the second embodiment, the retainer 9 and the blade-tip forming-portion 4 are adhered to each other by an adhering member 13. The adhering member 13 needs to withstand the temperature (for example, 400° C. to 500° C. or more) because the adhering member 13 is disposed in an environment at such a temperature. For example, the adhering member 13 may be an adhesive or a brazing material that is ceramic bond, alumina, silica, mullite, or the like in a slurry state. Further, the adhering member 13 may be a flexible adhesive which contains felt-like silica wool, ceramic fiber, or the like. Furthermore, instead of a configuration in which the retainer 9 and the blade-tip forming-portion 4 are adhered to each other, the retainer 9 and the band 11 may be adhered to each other, or the retainer 9 may be adhered to both the blade-tip forming-portion 4 and the band 11. The other configurations of the second embodiment are the same as those of the first embodiment shown in FIGS. 3 to 5, 6A, and 6B.

According to the second embodiment with the above-described configuration, since the configuration is similar to that of the first embodiment, it is possible to reduce a concentration of stress in the bonded portion between the blade 2 and the band 11, reduce the leakage of a gas between the blade 2 and the band 11, and simply fasten the blade 2 and the band 11 to each other during assembly.

Further, in the second embodiment, since the adhering member 13 is also used, it is possible to reinforce the fixing between the blade 2 and the band 11, and more strongly fasten the blade 2 and the band 11 to each other. Further, since the flexible adhesive is used, it is possible to further reduce a concentration of stress.

Furthermore, although the embodiments of the present invention have been described, the above-described embodiments of the present invention are merely examples, and the scope of the present invention is not limited thereto. The scope of the present invention is shown in the claims, and includes all modifications within the concept and the scope equivalent to those of the claims.

DESCRIPTION OF REFERENCE NUMERALS

1: CMC turbine stator blade
2: blade
3: blade body
4: blade-tip forming-portion
5: first fitting portion
6: fixing means
7: step
8: fixing groove
9: retainer
10: cutout portion
11: band
11A: first band
11B: second band
12: second fitting portion
13: adhering member

The invention claimed is:

1. A CMC turbine stator blade comprising:
a blade formed of a ceramic matrix composite material; and
a band formed of a ceramic matrix composite material or a metallic material, and supports the blade,
wherein the blade and the band are bonded to each other,
wherein the blade includes a first fitting portion to which the band is fitted at an outside thereof,
wherein the band includes a second fitting portion to which the first fitting portion is fitted at an inside thereof,
wherein the blade includes a blade body exposed to a combustion gas, and a blade-tip forming-portion extending from an end portion of the blade body in a height direction of the blade and including the first fitting portion,
wherein a step is formed at a boundary between the blade body and the blade-tip forming-portion disposed to support the second fitting portion,
wherein a fixing groove is formed in the blade-tip forming-portion disposed to extend along the periphery thereof,
wherein a retainer is fitted to the fixing groove and extends along the fixing groove such that the second fitting portion is sandwiched between the retainer and the step in the height direction of the blade, and
wherein the retainer is a single component which has a length encircling the blade-tip forming-portion and has a cutout portion at a part thereof.

2. The CMC turbine stator blade according to claim 1, wherein the retainer has both ends at the cutout portion that are bonded to each other.

3. The CMC turbine stator blade according to claim 2, wherein the retainer and the blade-tip forming-portion or the retainer and the band are adhered to each other.

4. The CMC turbine stator blade according to claim 1, wherein the retainer and the blade-tip forming-portion or the retainer and the band are adhered to each other.

5. A CMC turbine stator blade, comprising:
a blade formed of a ceramic matrix composite material; and
a band formed of a ceramic matrix composite material or a metallic material, and supports the blade,
wherein the blade and the band are bonded to each other,
wherein the blade includes a first fitting portion to which the band is fitted at an outside thereof,
wherein the band includes a second fitting portion to which the first fitting portion is fitted at an inside thereof,
wherein the blade includes a blade body exposed to a combustion gas, and a blade-tip forming-portion extending from an end portion of the blade body in a height direction of the blade and including the first fitting portion, wherein a step is formed at a boundary between the blade body and the blade-tip forming-portion disposed to support the second fitting portion, wherein a fixing groove is formed in the blade-tip forming-portion disposed to extend along the periphery thereof, wherein a retainer is fitted to the fixing groove and extends along the fixing groove such that the second fitting portion is sandwiched between the retainer and the step in the height direction of the blade, and wherein the retainer has a plurality of components extending in a circumferential direction of the blade-tip forming-portion and connected to one another to encircle the blade-tip forming-portion.

6. The CMC turbine stator blade according to claim 5, wherein the retainer and the blade-tip forming-portion or the retainer and the band are adhered to each other.

* * * * *